(12) United States Patent
Razzano

(10) Patent No.: US 12,006,992 B2
(45) Date of Patent: Jun. 11, 2024

(54) UNIT FOR DETECTING WEAR AND TEMPERATURE OF A BRAKING MEMBER OF VEHICLE

(71) Applicant: I.C.P. S.R.L., Castelnuovo Don Bosco (IT)

(72) Inventor: Tancredi Razzano, Piova' Massaia (IT)

(73) Assignee: I.C.P. S.R.L., Castelnuovo Don Bosco (IT)

( * ) Notice: Subject to any disclaimer, the term of this patent is extended or adjusted under 35 U.S.C. 154(b) by 367 days.

(21) Appl. No.: 17/599,203

(22) PCT Filed: Apr. 3, 2020

(86) PCT No.: PCT/IB2020/053213
§ 371 (c)(1),
(2) Date: Sep. 28, 2021

(87) PCT Pub. No.: WO2020/202102
PCT Pub. Date: Oct. 8, 2020

(65) Prior Publication Data
US 2022/0154793 A1 May 19, 2022

(30) Foreign Application Priority Data
Apr. 5, 2019 (IT) .......................... 102019000005202

(51) Int. Cl.
*F16D 66/02* (2006.01)
*F16D 66/00* (2006.01)

(52) U.S. Cl.
CPC ......... *F16D 66/027* (2013.01); *F16D 66/024* (2013.01); *F16D 2066/001* (2013.01)

(58) Field of Classification Search
CPC . F16D 66/027; F16D 66/024; F16D 2066/001
See application file for complete search history.

(56) References Cited

U.S. PATENT DOCUMENTS 3,805,228 A * 4/1974 Peeples ................. F16D 66/027
200/61.4
4,646,001 A * 2/1987 Baldwin ............... F16D 66/027
188/1.11 R
(Continued)

FOREIGN PATENT DOCUMENTS

DE 9011267 U1 8/1991
EP 0345208 A1 12/1989
(Continued)

OTHER PUBLICATIONS

International Preliminary Report on Patentability for International Application No. PCT/IB2020/053213 mailed Mar. 11, 2021.
(Continued)

*Primary Examiner* — Thomas W Irvin
(74) *Attorney, Agent, or Firm* — Dorsey & Whitney LLP

(57) ABSTRACT

A braking member of a vehicle is joined to a unit for detecting wear and temperature of the braking member; the unit comprising a sensing assembly, an electrical connector adapted to enable connection of the unit to an electrical circuit of the vehicle, and an electrical wiring for connection of the sensing assembly to the electrical connector; the sensing assembly comprising an attachment body having an axis and configured to be stably connected to the braking member; the attachment body housing wear detection means and temperature sensor means arranged along the axis and embedded in the attachment body, while the electrical connector houses an electronic unit for receiving and processing signals and for sending an output signal through the electrical connector.

13 Claims, 3 Drawing Sheets

(56) References Cited

U.S. PATENT DOCUMENTS

| | | | | |
|---|---|---|---|---|
| 5,559,286 | A * | 9/1996 | White | F16D 66/026 |
| | | | | 73/129 |
| 5,608,376 | A * | 3/1997 | Ito | F16D 66/027 |
| | | | | 200/61.4 |
| 5,637,794 | A * | 6/1997 | Hanisko | F16D 66/026 |
| | | | | 374/E1.008 |
| 6,274,819 | B1 | 8/2001 | Li et al. | |
| 6,366,201 | B1 * | 4/2002 | Hanisko | F16D 66/026 |
| | | | | 188/1.11 R |
| 6,384,721 | B1 * | 5/2002 | Paielli | F16D 66/02 |
| | | | | 188/1.11 R |
| 7,165,657 | B2 * | 1/2007 | Palladino | F16D 66/026 |
| | | | | 188/1.11 E |
| 9,717,141 | B1 * | 7/2017 | Tegg | A61B 8/445 |
| 9,964,168 | B1 * | 5/2018 | Pennala | F16D 66/027 |
| 2006/0076196 | A1 * | 4/2006 | Palladino | F16D 66/026 |
| | | | | 188/1.11 E |
| 2010/0017087 | A1 | 1/2010 | Degenstein | |
| 2010/0283595 | A1 * | 11/2010 | Korecki | F16D 66/022 |
| | | | | 340/454 |
| 2013/0192352 | A1 | 8/2013 | Lanzani | |
| 2018/0128334 | A1 * | 5/2018 | Pennala | F16D 66/024 |

FOREIGN PATENT DOCUMENTS

| | | |
|---|---|---|
| EP | 1174636 A2 | 1/2002 |
| EP | 1174819 A2 | 1/2002 |
| EP | 1645771 A2 | 4/2006 |
| JP | 2008103415 A | 5/2008 |
| WO | 2020061634 A1 | 4/2020 |

OTHER PUBLICATIONS

International Search Report and Written Opinion from International Application No. PCT/IB2020/053213 mailed Jul. 13, 2020.
First Office Action for Chinese Patent Application No. 202080032664X mailed May 16, 2023.

\* cited by examiner

UNIT FOR DETECTING WEAR AND TEMPERATURE OF A BRAKING MEMBER OF VEHICLE

CROSS-REFERENCE TO RELATED APPLICATIONS

This patent application is a U.S. National Stage of PCT International Application No. PCT/IB2020/053213 filed on 3 Apr. 2020, which claims priority from Italian Patent Application No. 102019000005202 filed on 5 Apr. 2019, the entire disclosure of each of which is incorporated herein by reference.

TECHNICAL FIELD

This invention relates to a unit for detecting the wear and temperature of a braking member, such as a brake pad, or a brake shoe for a drum brake, or another friction braking device of a vehicle, to which the following discussion will make explicit reference without any loss of generality thereby.

In order to control the operating conditions of a motor vehicle, there is a need to know as continuously as possible both the wear of the braking device and its working temperature. As far as the working temperature is concerned, thus must be measured not only continuously but also very accurately, since differences of even just a few degrees between the detected and actual temperatures are unacceptable for the optimum control of the vehicle's different operating conditions.

BACKGROUND ART

To date, there are well known sensor assemblies that make it possible to simultaneously detect both the temperature and wear of the braking device. One of these sensor assemblies is described in the patent EP 0 545 063 A1. The sensor assembly described uses an electrical circuit comprising a series of thermistors arranged astride two branches common to all the thermistors. The thermistors are progressively eliminated during the braking device's wear, resulting in a voltage variation U at the terminals of a reference resistor and, therefore, of the acquisition device.

The sensor assembly is based on the evaluation of the above-mentioned signal U, in particular, of the corresponding gradient AU/At and/or the difference between two stationary states with a stationary vehicle with a braking assembly in thermal equilibrium with the environment. The detection of the voltage U depends on the equivalent conductance and this means that the breakdown or failure of one of the thermistors will cause the entire sensor assembly to fail, thus incorrectly evaluating the gradient or the difference between the two stationary states.

In addition to this, the temperature behaviour of the individual thermistors is a function of their relative position in relation to a mobile braking member, such as the brake disc of a disc braking system.

As a result, the above-mentioned sensor assembly suffers from the drawback of not being sufficiently reliable and, above all, accurate.

In addition to this, the above-mentioned, known assembly is particularly large and, therefore, difficult to use on any braking device and, in particular, on brake pads for motor vehicles.

DISCLOSURE OF INVENTION

The purpose of this invention is to provide a unit for detecting the wear and temperature of a braking member of a vehicle, which is extremely efficient and reliable, very precise, and practically impervious to the conditions of use.

An additional purpose of this invention is to provide an extremely compact detecting unit that can be used regardless of the type of vehicle and the type and size of the braking member with which it is joined.

According to this invention, a unit for detecting the wear and temperature of a braking member of a vehicle is provided, as claimed in claim 1.

BRIEF DESCRIPTION OF THE DRAWINGS

The invention will now be described with reference to the appended drawings, which illustrate a non-limiting embodiment thereof, wherein.

BEST MODE FOR CARRYING OUT THE INVENTION

Figure 1:
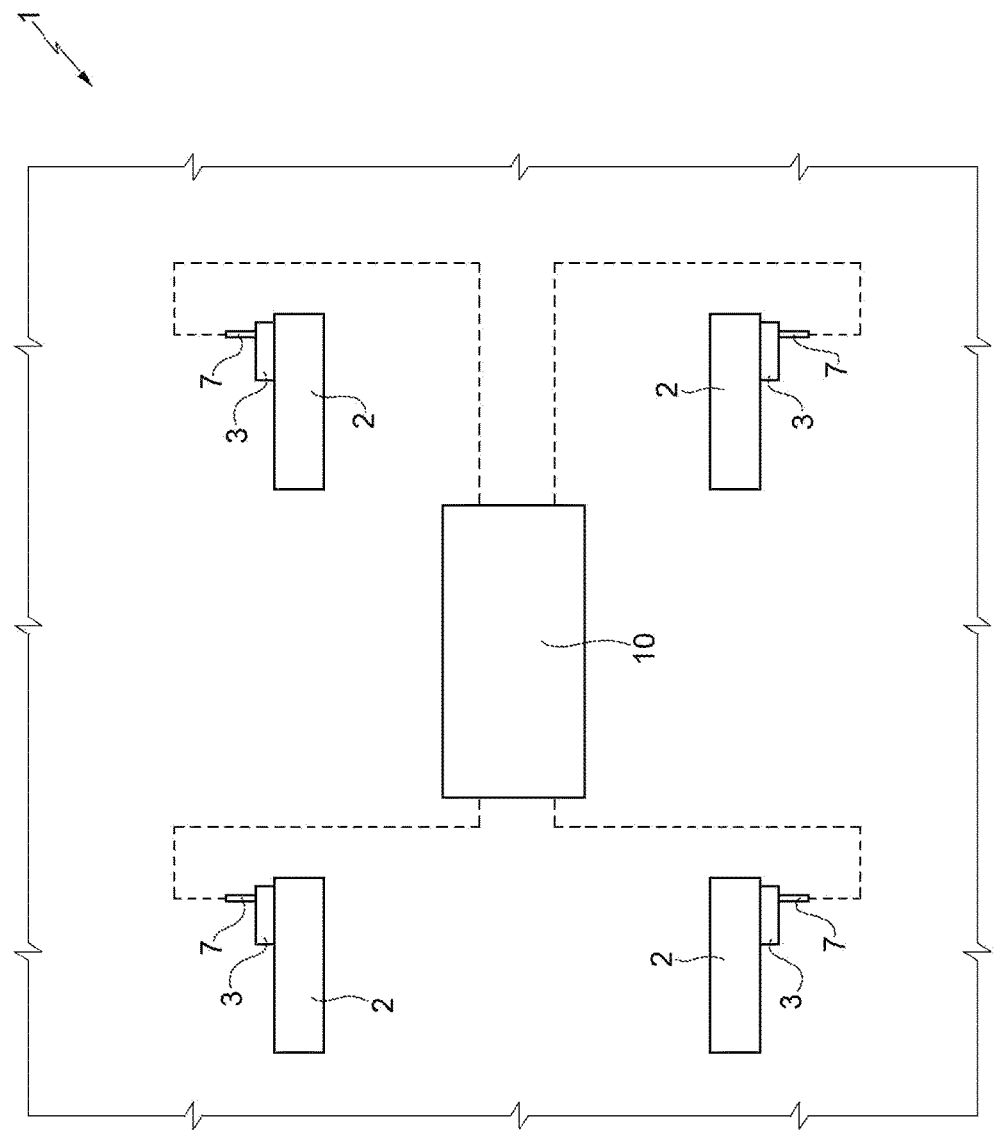
FIG. 1 illustrates, in plan and blocks, a vehicle having a monitored braking system and equipped with a plurality of wear and temperature detecting units of braking members, each of them produced according to the precepts of this invention.

In FIG. 1, the reference number 1 indicates, as a whole, a vehicle comprising a plurality of wheels 2 and a related braking assembly 3, known in itself, for each wheel 2.

Figure 2:
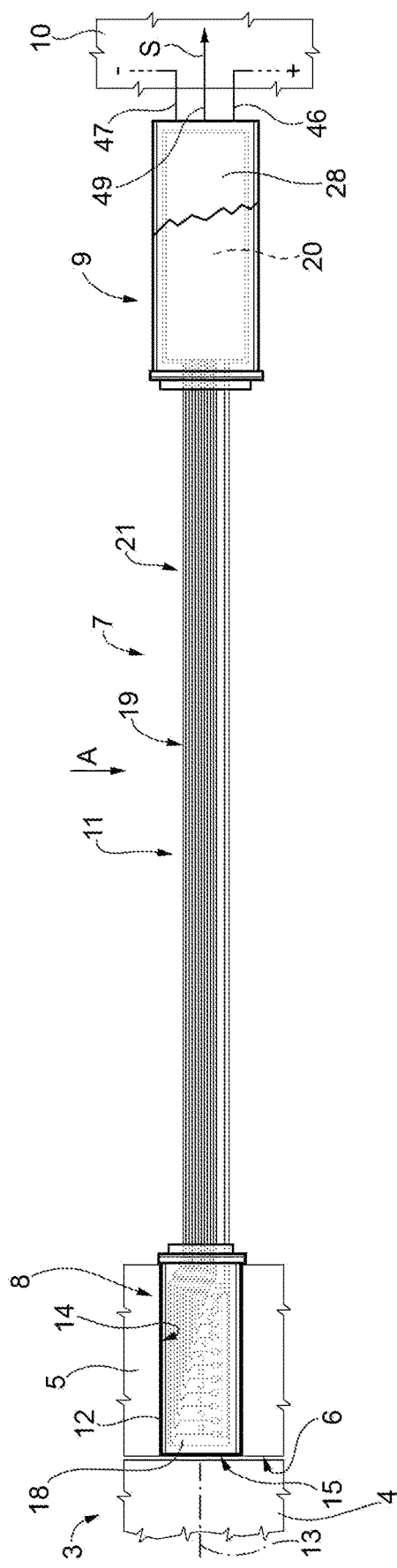
FIG. 2 illustrates in a plan view on a greatly enlarged scale, the detecting unit in FIG. 1.
Figure 3:
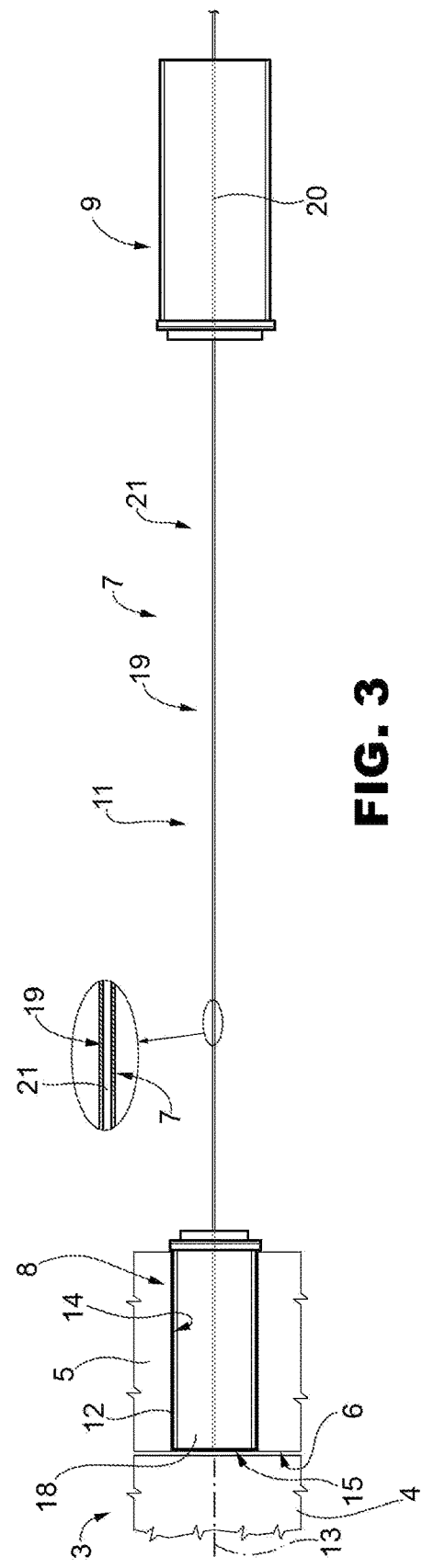
FIG. 3 is a view along the direction of the arrow A in FIG. 2.

With reference to FIGS. 2 and 3, each braking assembly 3 comprises one braking disc 4 and at least one brake pad 5 having a flat surface 6 for rubbing against the braking disc 4.

Each braking assembly 3 is joined to its own unit 7 for detecting the wear and working temperature of the corresponding brake pad 5.

Figure 4:
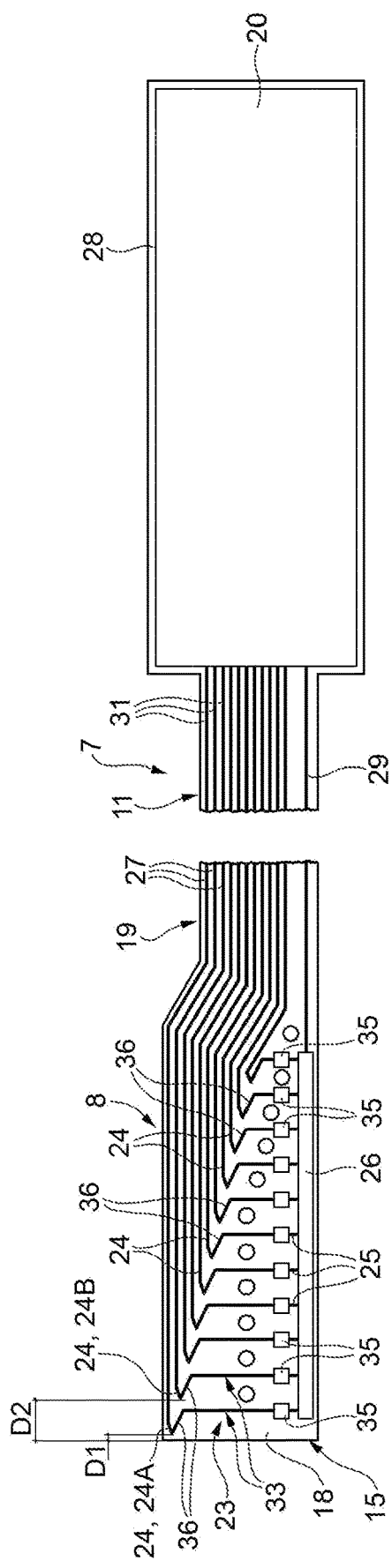
FIG. 4 illustrates, in a plan view on a greatly enlarged scale, two opposite end portions of the detecting unit in FIG. 2 with parts removed for clarity.

With reference to FIGS. 2 to 4, each unit 7 comprises a sensing assembly 8, an electrical connector 9 designed to enable the connection of the corresponding unit 7 to an electrical unit 10 for steering the vehicle 1, and an electrical wiring 11 for connecting the corresponding sensing assembly 8 to the electrical connector 9.

With reference to FIG. 2, the sensing assembly 8 comprises an attachment body 12, preferably, but not necessarily, cylindrical, which has its own axis 13 and is inserted and locked, for example by gluing or using retention elements, in a compartment 14 of the brake pad 5 so that its axis 13 extends orthogonally to the corresponding rubbing surface 6 and its front surface 15 lying on or slightly behind the corresponding rubbing surface 6.

Conveniently, the attachment body 12 is made of insulating resin that is resistant to the working temperatures of the brake pad, conveniently, but not necessarily, of Vincolite.

Again with reference to FIGS. 2 and 4, in each attachment body 12 a terminal section 18 of a flexible tape 19 is embedded, which has an opposite terminal section 20 extending inside the connector 9 and an intermediate section 21 extending between the attachment body 12 and the connector 9 itself.

Conveniently, the tape 19 consists of a single piece and is made of polyimide, for example Kapton, which is marketed by DuPont.

A row 23 of electrical detection circuits 24 is arranged, independent of each other, is arranged on the section 18 of tape 19. The electrical circuits 24 are arranged cascaded along the axis 13, and beginning from the front surface 15, and are made by depositing electrically conductive material on an external surface of the tape 19.

With reference to FIG. 4, the electrical circuits 24 have corresponding first terminals 25 that are all electrically connected to a conductive track 26 housed in the attachment body 12 parallel to the axis 13 and second terminals 27 electrically separated from each other. The track 26 is, in turn, electrically connected to an electrical pole with the tension V1 by means of an electrical line 29 of the wiring 11, while the second terminals 27 are connected to other tension electrical poles V2 equal to or different from the tension V1, by means of corresponding lines 31.

The terminals 25 and 27 are managed by an electronic unit 28 or CPU, e.g. a microprocessor, in which the lines 29 and 31, which are electrically connected to the above-mentioned electrical poles with the tensions V1 and V2, merge.

The electronic unit 28 is configured to emit a digital output signal S indicating the wear and instantaneous temperature of the brake pad 5, as better described below.

The track 26, the lines 29 and 31, and at least part of the circuits 24, are made by depositing conductive material on the outer surface of the tape 19.

Again with reference to FIG. 4, each of the circuits 24 has a section 33 that is orthogonal to the axis 13 and, therefore, parallel to the surfaces 6 and 15, which comprises a thermal detector 35 for detecting the temperature of the pad 5 and a wear detector 36 for detecting the wear of the pad 5 itself. In each circuit 24, the thermal detector 35 and the wear detector 36 are connected in series with each other and with the temperature detector 35 arranged adjacent to the track 26.

Each temperature detector 35 consists of an RTD and, preferably, of a platinum RTD. Conveniently, but not necessarily, each RTD is defined by a PT100 probe or equivalent device. The temperature detectors 35 are the same.

Each wear detector 36 is a detector that can be sheared following the progressive consumption of the pad 5.

With reference to FIG. 4, each wear detector 36 is defined by an inverted V-shaped portion of the corresponding circuit 24. Each V-shaped portion has a cusp extending adjacent to the circuit 24 that precedes it in the direction of the wear. The distance between two cusps determines the wear detection interval. The V-shaped portions are equal in terms of size and geometry.

Figure 5:
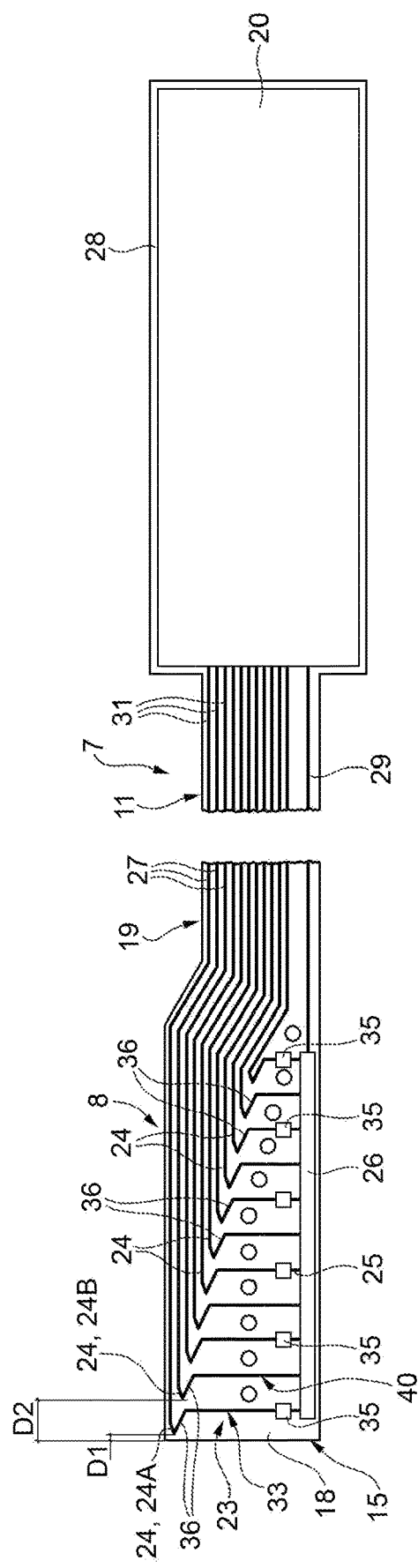
FIG. 5 illustrates a variant of a detail in FIG. 4.

In the variant illustrated in FIG. 5, the row 23 of circuits 24 comprises an additional circuit 40 between two circuits 24 with terminals connected one to the track 26 and the other to a corresponding line 31 that merges with the electronic unit 28. Each additional circuit 40 differs from the other circuits 24 in the mere fact that it has no temperature detector 35.

According to an additional variant, an additional detection circuit is arranged between two consecutive 24 circuits, the additional circuit differing from the others in that it lacks the V-shaped portion.

Again with reference to FIGS. 2 and 4, the electronic unit 28 is housed in the connector 9 and has two terminals 46 and 47, or power supply poles, and one output terminal 49 for the signal S.

According to one variant, there is no output terminal 49 and the output signal is modulated on one of the two terminals 46 or 47.

The electronic unit 28 has an electrical connection with each of the lines 31, and is configured and set so as to interact with the circuits 24, 40 and emit, during the wear of the pad 5, the output signal S that, as mentioned above, depends on the wear and on the working temperature of the pad 5 itself.

As far as the wear indication is concerned, it will be interpreted by the microprocessor by detecting the electrical continuity at the terminals of the circuits 24, 40 as they are interrupted.

The operation of the unit 7 will now be described considering, for simplicity of explanation, only two circuits 24 and, for example, the two circuits 24A and 24B in FIG. 4 adjacent to the surface 15, and starting from the condition in which the electronic unit 28 detects the voltage difference between the line 29 and the corresponding line 31 of the circuit 24A.

Starting from this condition, the microprocessor will, first of all, perform a self-diagnosis during start-up. This step will detect the integrity of the circuits 24,40. As a result of the braking action exerted by the brake disc 4-pad 5 contact, the brake pad 5 starts to wear and to heat up in proportion to the intensity of the pressure in braking and the braking time. At each braking action, and depending on the duration and intensity of the braking action, the temperature variation of the pad 5 causes a corresponding variation of electrical resistance in the temperature detector 35 of the circuit 24A. The temperature variation produces a current variation that passes through the temperature detector 35, i.e. the RTD, and this variation is received and processed by the electronic unit 28 that, in response, emits the signal S depending on the detected temperature to the vehicle 1 steering unit 10. Preferably, the output signal S is a Pulse Width Modulation (PWM) signal, the duty cycle of which provides a temperature indication, while the interval between PWM packets will indicate which of the temperature and wear detector circuits is in use or interrupted.

When the wear of the pad 5 exceeds a wear limit value D1 (FIG. 4), the cusp of portion 36 is intercepted by the disc 4 and progressively removed. When the cusp is completely removed, the circuit 24A is interrupted and, with it, the passage of current through the circuit 24A itself. In this condition, the electronic unit 28 detects a no-load voltage between line 29 and the line 31 of the interrupted circuit 24A and generates the output signal that depends on the progressive wear of the pad 5. In this condition, the temperature detector 35 of the same circuit 24A is also isolated. The electronic unit 28, when it detects the interruption of the electrical circuit 24A, leaves the circuit 24A and reconfigures itself so as to consider the voltage difference between one line 29 and the other line 31 of the circuit 24B, depending on the working temperature of the pad 5.

Such a condition remains until the brake pad 5 reaches a second wear limit value D2 and the brake disc 4 also interrupts the circuit 24B by removing the cusp of the portion 35, effectively cancelling the passage of current between one line 29 and the other line 31 of the circuit 24B.

The operations described above begin again in the same order and continue until the last circuit 24 is interrupted by the brake disc 4 and a signal will be interpreted as the need to replace the pad 5.

When the circuit 40 without the temperature detector 35 is placed between the electrical circuits 24A and 24B, as illustrated in FIG. 5, the electronic unit 28 is programmed and configured so as to use the wear and temperature information coming from the circuit 24A and, after the interruption of the same circuit 24A, it simultaneously interprets the signals both from one circuit 24B and the additional circuit 40, i.e. through one line 29 and both the corresponding lines 31.

In this way, the electronic unit 28 initially interprets the temperature information from the circuit 24B and, at first, the wear information from the additional circuit 40. When the additional circuit 40 is also interrupted, the electronic unit 28 updates the wear information from the circuit 24B while maintaining the temperature information.

In the self-diagnosis step, assuming one or more temperature detectors 35 have been worn previously, the electronic unit 28 will exclude such temperature detector(s) 35 by acquiring the temperature from the first temperature detector 35 closest to the disc.

In the steady state, when a temperature detector 35 is isolated due to progressive wear, the resulting reading will provide a value at the top of the scale.

If, in a certain number of clock cycles of the electronic unit 28, the above-mentioned value remains at the top of the scale, the electronic unit 28 interprets this as an interrupted temperature detector and the same electronic unit 28 will exclude it from the thermal detection, considering the last consistent data as valid and moving on to examine the following temperature detector 35.

The unit 7 thus produced has lower construction costs than the solution with equal circuits 24 and a temperature detection that is, in any case, sufficiently precise in most applications.

It is clear from the above that the wear and temperature detecting unit 7 is simple and economical to implement, on the one hand, and extremely efficient and reliable, on the other.

The above is due to the fact that the unit 7 consists of a plurality of electrical circuits that are identical to each other in the case of the solution illustrated in Figure and different in the case in FIG. 5 but always independent of each other and arranged cascaded.

In addition to this, in the case of the solution illustrated in FIG. 4, the unit 28, regardless of the degree of wear of the pad 5, validates the wear and temperature information from a single circuit 24 and autonomously changes to the next circuit 24 in use only when it detects that the circuit in use itself has been interrupted. Such a mode of operation ensures that an electrical circuit 24 does not affect or interfere with the other electrical circuits 24 during the progressive wear of the pad 5. The solution thus produced makes it possible to obtain detected temperature values that deviate by a few degrees (normally 3°-5°) from the actual operating values.

The cascaded arrangement of the various electrical circuits 24, 40 makes it possible to limit the dimensions of the unit 7 that, consequently, is applied on any braking device and in any position of the same.

The use of a flexible tape, in general, and in polyimide, for example Kapton, in particular, as a support base for all the electrical circuits 24, 40, makes it possible, on the one hand, to guarantee the flexibility of the wiring that extends between the attachment body 12 and the connector 9 and, on the other hand, to use an attachment body with the same overall dimensions as a traditional wear detector, thus eliminating the need to modify the current braking members.

The overall dimensions of the unit 7 are also limited by the fact that the electronic unit 28 is housed in the same connector 9 for connecting to the electrical wiring of the vehicle 1.

The use of a platinum RTD, for example a PT100, makes it possible to operate in particularly high temperature ranges and up to temperatures in the order of 850°, to have a practically linear characteristic curve, and to operate with excellent precision. In addition to this, the above-mentioned thermistors have excellent and consistent stability.

It is clear from the above that the thermoelements described above can be replaced by other thermistors or resistive paste deposits, or even by diodes, taking advantage of the thermal dependence of the latter in their operating characteristics.

The invention claimed is:

1. A unit for detecting wear and temperature of a braking member of a vehicle, the unit comprising:
   a sensing assembly;
   an electrical connector adapted to enable connection of the unit to an electrical circuit of said vehicle; and
   an electrical wiring for connection of said sensing assembly to said electrical connector;
   wherein the sensing assembly includes:
   an attachment body having an axis and configured to be stably connected to the braking member;
   detection means for detecting wear of the braking member;
   sensor means for detecting a temperature of the braking member; said detection means and said sensor means being arranged along said axis and housed in said attachment body, said attachment body housing a row of electrical detection circuits arranged cascaded along said axis; said row of electrical detection circuits including a plurality of first electrical detection circuits each of which includes a respective wear detector and at least one second detection circuit having a respective temperature sensor;
   wherein said first electrical detection circuits and the at least one second detection circuit present respective first terminals electrically connected together and to a first electrical pole, and respective second terminals connected to respective second electrical poles electrically separate from each other.

2. The unit according to claim 1, further comprising an electronic unit configured to receive signals from said wear detection means and from said temperature sensor means, to process said signals, and to send an output signal through said electrical connector; said electronic unit being housed in said electrical connector and being electrically connected to said electrical wiring.

3. The unit according to claim 1, wherein said row of electrical detection circuits includes a plurality of said second detection circuits each of which has a respective temperature sensor.

4. The unit according to claim 1, wherein at least one of said plurality of first detection circuits includes a respective wear detector and a respective temperature sensor arranged in series with respect to one another between the respective said first and second electrical poles.

5. The unit according to claim 4, wherein said temperature sensors include respective resistance temperature detectors (RTDs) that are the same as one another.

6. The unit according to claim 5, wherein each of the RTDs comprises a PT100 probe.

7. The unit according to claim 1, wherein said first and second detection circuits alternate with one another along said axis.

8. The unit according to claim 7, wherein at least part of said second detection circuits includes a corresponding wear detector and a corresponding temperature sensor arranged in series with respect to one another between the respective said first and second electrical poles.

9. The unit according to claim 1, wherein said first and second poles are arranged within said electrical connector.

10. The unit according to claim 1, further comprising a flexible tape for supporting said wear detection means, said temperature sensor means, and said electrical wiring; said flexible tape having a terminal section housed in said attachment body and an opposite terminal section arranged within said electrical connector.

11. The unit according to claim 10, wherein said flexible tape includes a polyimide film.

12. The unit according to claim 10, wherein said flexible tape has a terminal section embedded in said attachment body; said attachment body consisting of a single piece.

13. The unit according to claim 1, wherein said attachment body is made of insulating resin that is resistant to a working temperatures of the brake.

\* \* \* \* \*